July 16, 1940.  W. E. ROSEBUSH  2,208,345
FOLDING, STUFFING, AND SEALING MACHINE
Filed March 1, 1938   10 Sheets-Sheet 1

WITNESSES

INVENTOR
Waldo E. Rosebush
BY
ATTORNEYS

July 16, 1940.  W. E. ROSEBUSH  2,208,345
FOLDING, STUFFING, AND SEALING MACHINE
Filed March 1, 1938   10 Sheets-Sheet 8

WITNESSES

INVENTOR
Waldo F. Rosebush
BY
ATTORNEYS

July 16, 1940.  W. E. ROSEBUSH  2,208,345
FOLDING, STUFFING, AND SEALING MACHINE
Filed March 1, 1938  10 Sheets-Sheet 9

INVENTOR
Waldo E. Rosebush
BY
Munn Anderson & Liddy
ATTORNEYS

July 16, 1940.　　　W. E. ROSEBUSH　　　2,208,345
FOLDING, STUFFING, AND SEALING MACHINE
Filed March 1, 1938　　　10 Sheets-Sheet 10

WITNESSES

INVENTOR
Waldo E. Rosebush
BY
　　ATTORNEYS

Patented July 16, 1940

2,208,345

UNITED STATES PATENT OFFICE 2,208,345

FOLDING, STUFFING, AND SEALING MACHINE

Waldo E. Rosebush, Millwood, Wash.

Application March 1, 1938, Serial No. 193,490

10 Claims. (Cl. 270—46)

This invention relates to a machine for folding sheet material, stuffing or inserting the folded material together with additional matter constituting enclosures into empty unsealed closures or envelopes, and then sealing and discharging them successively.

The machine may be used advantageously for expeditiously preparing large quantities of matter for delivery in the mails.

More particularly, the machine is designed and adapted for use in large mailing departments for the purpose of enclosing ordinary correspondence, invoices, bills, cards, advertising matter, mimeographed letters, and other usual office output in envelopes of suitable types, including "outlook" and "window" envelopes.

The principal object of the invention is the provision of a machine of the indicated character embodying novel features of construction and operation.

With the foregoing and other objects in view, the invention resides in the combinations, arrangements and operations of the parts as hereinafter described and claimed, and as illustrated in the accompanying drawings, in which—

Fig. 9 is a view similar to Fig. 8, but illustrating the manner in which the item is being precipitated for transference to the bunching means;

In the illustrated embodiment of the invention the machine has a base 10 from which rise side frames 11 and 12 of substantially the same construction, the frames arranged in spaced parallel relation. A main roller 13 is arranged between the frames near the front end thereof. The roller 13 is mounted on a shaft 14 whose opposite ends are journaled in bearings respectively embodied by the frames 11 and 12. The roller 13 is rotated through the intervention of the shaft 14, a grooved pulley 15 fast on the shaft 14, and a grooved pulley 16 fast on the shaft of an electric motor M secured to the frame 11. A belt 17 encircles the pulleys 15 and 16. Auxiliary rollers 18 and 19 respectively cooperate with the roller 13 to put a first fold in each of the sheets to be folded and to advance the sheet for the second fold and to continue the advance of the sheet.

The roller 18 has stub shafts 20 on the opposite ends thereof in axial alinement with each other and these shafts are received respectively in notches 21 in the frames. Likewise, the roller 19 has stub shafts 22 on the opposite ends thereof respectively which are in axial alinement and which are received respectively in notches 23 in the frames 11 and 12. The stub shafts 20 and 22 on each side of the machine are connected together by a contractile spring 24, and each stub shaft 22 is under the influence of a compression spring 25 which has one end bearing on the shaft 22 and its opposite end bearing on the frame 11 or 12, as the case may be. The frame has a recess in order to accommodate the spring 25. Rotary motion is transmitted from the main roller 13 to the auxiliary roller 19 by a large gear 26 carried by the roller 13 and a small gear 27 fast to one of the shafts 22, said gear 27 meshing with the gear 26. The springs 25 serve to maintain the roller 19 in yielding contact with the roller 13. The springs 24 serve to retain the rollers 18 and 19 in yielding contact with each other at all times. The roller 18 is moved slightly up and down, and this is accomplished by carriers 28 through which the stub shafts 20 and 22 extend. The stub shafts 22 serve as pivots for the carriers 28. Levers 29 are carried by the frames 11 and 12 respectively and cooperate with the carries 28. Each lever 29 is under the influence of a compression spring 30 carried by a lug 32 on the adjacent fame. Each lever 29 is actuated by a cam 33 fixed to the shaft 14. It will therefore be understood that in each revolution of the roller 13, the auxiliary roller 18 will be moved up and down for a purpose to appear.

Use is made of a holder or magazine 40 which is of rectangular formation open at the back and upper end. The lower end near the bottom has a rod 41 connected therewith whose opposite ends are journaled in bearings 42 respectively carried by the base 10. The magazine 40 is thus mounted for pivotal or oscillatory movement. The magazine 40 has a bottom wall 43 which is provided with an opening 44 nearer the upper end of the magazine than its lower end. The rollers 18 and 19 are disposed at the opening 44 so as to act on each sheet to be folded which is presented thereto. A multiplicity of the sheets are arranged in the magazine 40 and are presented flatwise in succession due to the fact that they are arranged in a pile or stack within the magazine 40. These sheets of letter size in the present instance, are 8½ inches wide by 11 inches long. Each sheet to be received in the large size envelopes is given two folds spaced approximately equi-distantly transversely of the longitudinal axis of the sheet. The large size envelope referred to to receive these folded sheets would be 4⅛ inches by 9½ inches.

The rollers 18 and 19 which rotate opposite to each other are designed and adapted to act on each sheet S presented thereto, and withdraw it from the magazine 40 through the opening 44, and at the same time fold the sheet itself transversely. The fold occurs from one end of the sheet a distance equal to about one-third the length of the sheet. The rollers 18 and 19 not only fold each sheet by creasing the same, but also serve in conjunction with the main roller 13 to advance each sheet in order that it may be given a second fold in a manner to be explained. If desired the pile of sheets in the magazine may be under a weight in order to press them with the required pressure in contact with the surfaces of the rollers 18 and 19. In order to insure the pick-up of each successive bottom sheet, the roller 18 has been made to move slightly up and down, as explained hereinabove. If jogging of the magazine 40 is advisable to properly advance lower ends of the sheets, then carriers 28 are connected with the magazine to rock it to and fro on axis 41.

Use is made of a sheet folding pocket 45 made preferably of a single piece of sheet metal so as to provide a flat fold plate or member 46 and a back check plate or member 47 joined to the plate 46 by a curved bight 48. The lower edge portion 49 of the plate 46 is curved so that the mouth of the pocket will be flared to readily receive the leading edge of the sheet as it is advanced by the rollers 13 and 19. The pocket is suspended on a rod 50 which is secured to the plate 47. The opposite ends of the rod 50 are journaled in bearings 51 carried by the frames 11 and 12 respectively. The pocket 45 is thus mounted so as to swing, oscillate or pivot on a horizontal axis. A deflector 52 overlies the cylindrical surface of the roller 13 between the roller 19 and the mouth of the pocket 45. The deflector 52 is supported at the opposite ends by bosses 53 which are integrally part of the frames 11 and 12 on the outside thereof. The deflector 52 consists of stock which is round in cross section at the ends and half round between the ends for the major portion of the length thereof, so as to be disposed parallel to the axis of rotation of the roller 13 and overlying the cylindrical surface. The deflector 52 serves to deflect the leading edge of each advancing sheet which has been previously folded by the rollers 18 and 19 into the pocket 45. An auxiliary feed roller 54 cooperates with the main roller 13. This roller 54 has alined stub shafts 55 on the opposite ends thereof respectively which are journaled in bearings embodied by the frames 11 and 12. One of the shafts 55 has a gear 56 which meshes with the gear 26 thereby causing the roller 54 to be rotated in response to the rotation of the main roller 13 and in a direction opposite to the latter. The roller 54 is arranged in proximity to the folding pocket 45 in order to be engaged by the back plate 47 thereof to limit the movement of the pocket. After each sheet has been given the first fold by the rollers 18 and 19 it is advanced by the action of the rollers 13 and 19. The leading edge thereof is deflected by the deflector 52 into the pocket 45. The pressure of the leading portion of the sheet as it is forced into the pocket 45 forces the latter against the roller 54. When the leading portion of the sheet encounters the bight 48 as it moves upwardly in the pocket, due to the continued advancement of the sheet the latter will be forced between the roller 54 and the roller 13. This action takes place because the sheet will bulge as it passes over the deflector 52, and because the leading edge portion encounters the bight 48. The bulge is stopped in its upward movement by the curved edge 49. The sheet being pinched between the rollers 13 and 54 will be creased transversely and thus the sheet will be given its second fold.

However, while each sheet is being given its second fold, additional matter will be inserted or introduced between folds of the sheet to be advanced therewith and subsequently to be stuffed into an empty unsealed envelope in a manner to be explained. The additional matter above referred to is to be known as inserts or enclosures and, among other things, will consist of invoices, bills, cards, advertising matter, and other usual office output.

Figures 3, 19, 20:
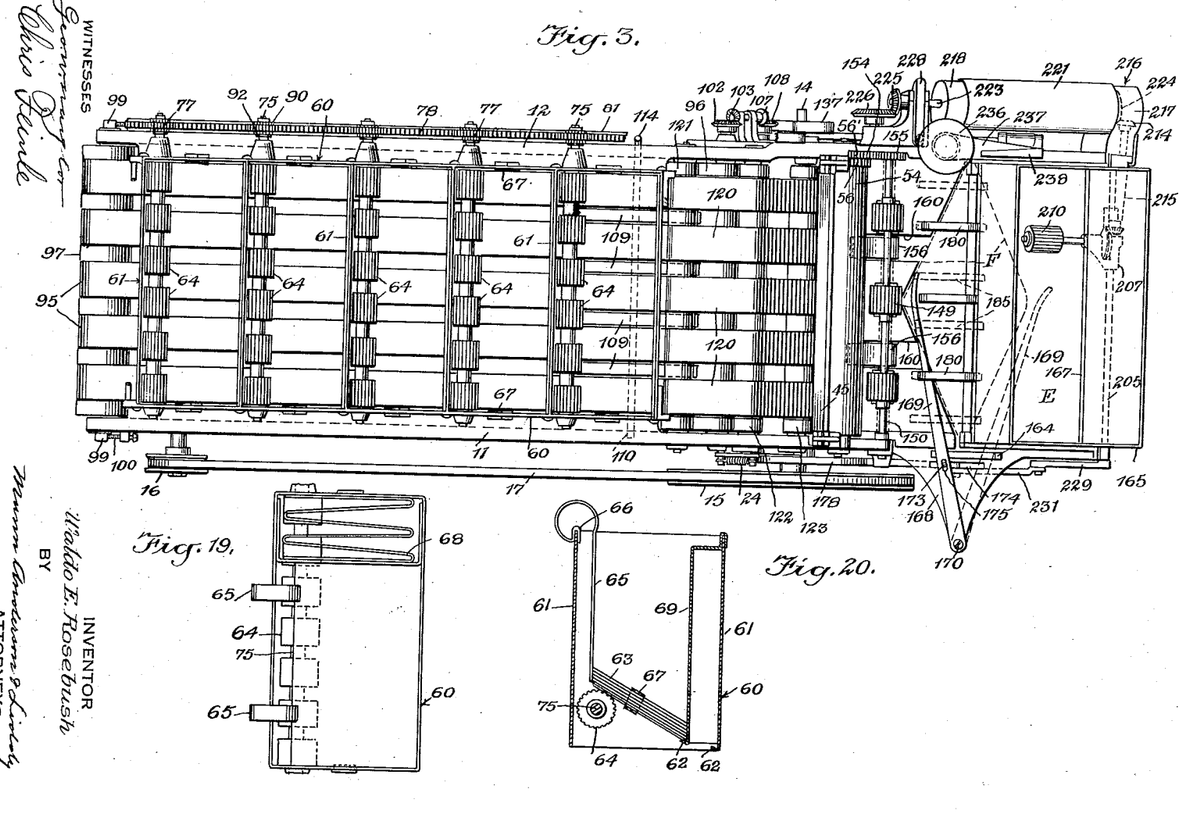
Fig. 3 is a plan of the machine.
Fig. 19 is a top view of one of the insert magazines and an accessory therefor so as to accommodate inserts of various lengths.
Fig. 20 is a vertical section of an insert magazine showing accessories therefor so as to accommodate inserts of various widths.
Figure 4:
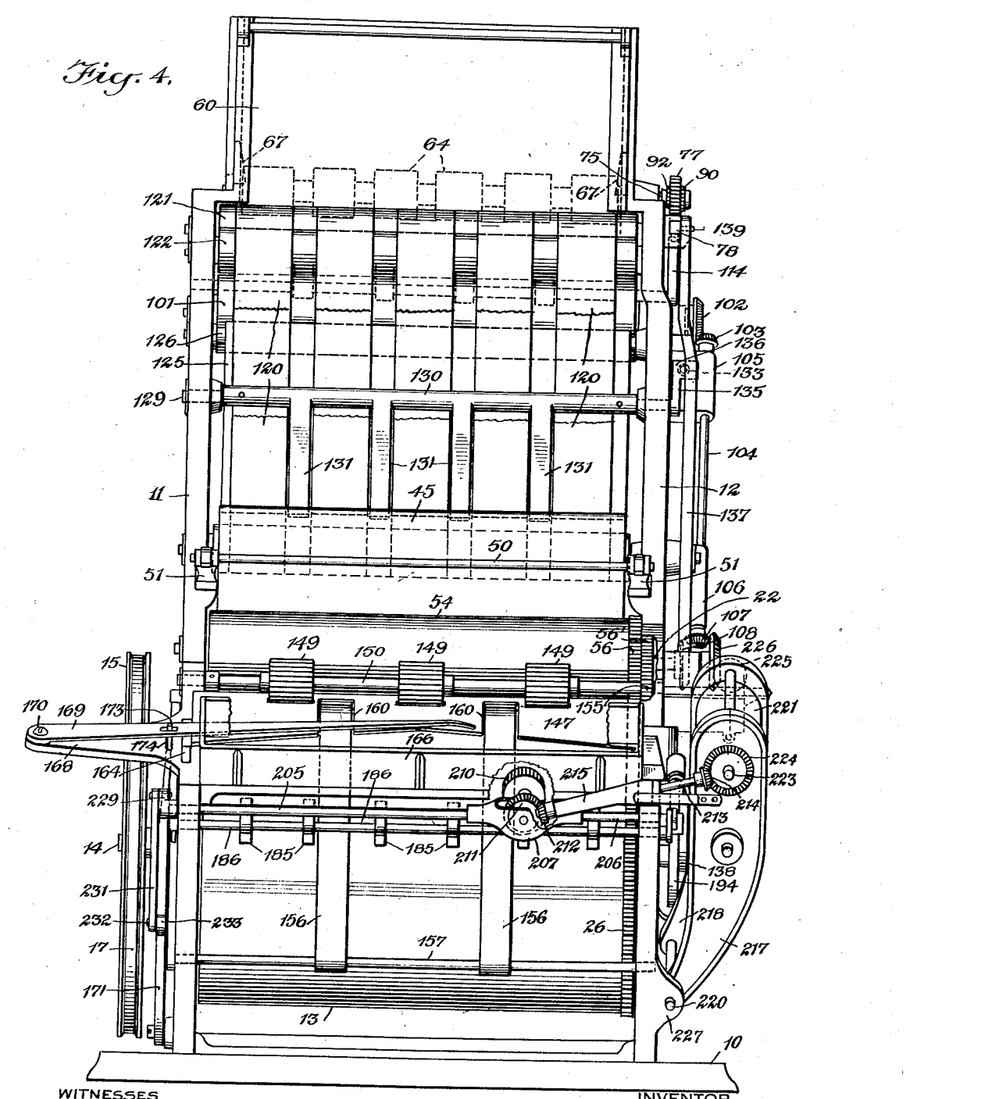
Fig. 4 is a front view.
Figure 5:
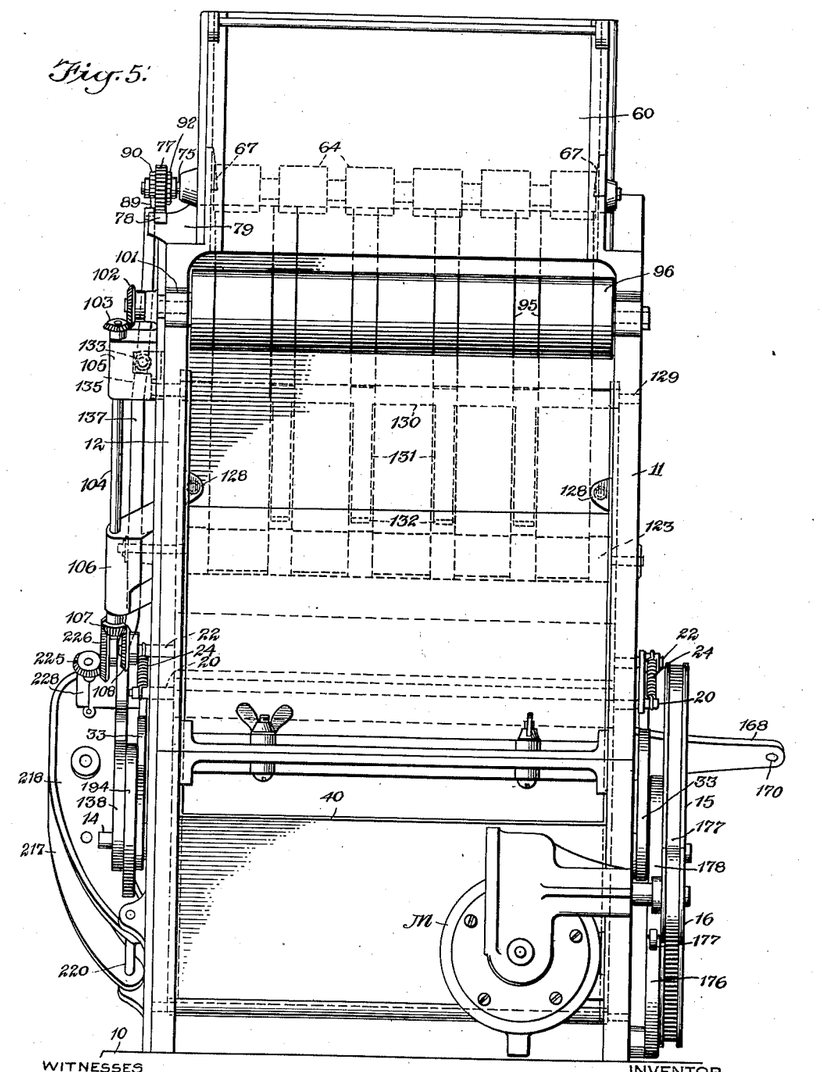
Fig. 5 is a rear view.
Figure 6:
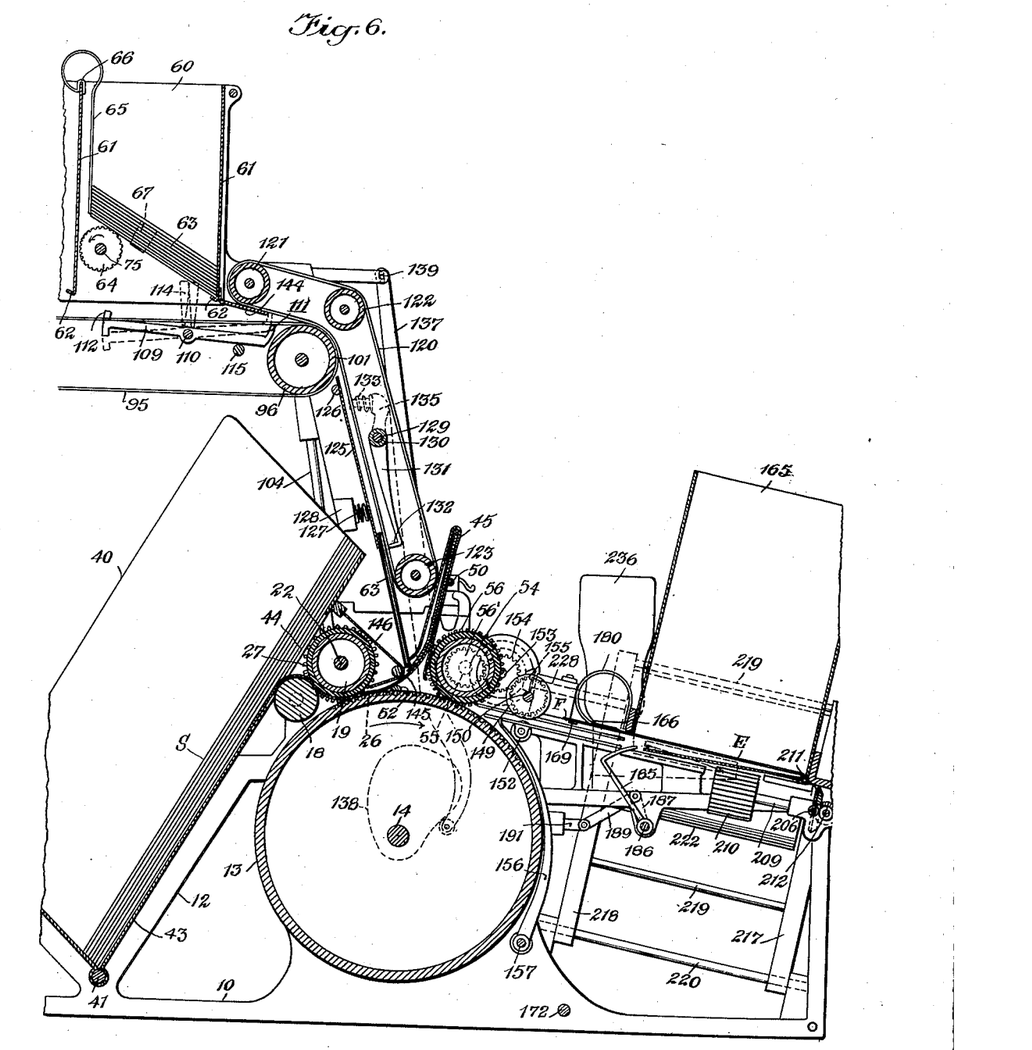
Fig. 6 is an enlarged fragmentary central vertical section.

The additional matter referred to above will be contained in holders or magazines 60 formed at the top of the machine between the side frames 11 and 12. In the present instance there are five magazines 60. Transverse partitions or dividing walls 61 between the frames 11 and 12 combine with the latter to form the magazines 60. Each magazine is open both at the top and the bottom, as shown most clearly in Figs. 8 and 9. The lower edge of each wall 61 has an inturned and slightly upwardly inclined flange which constitutes an abutment 62 extending the full length of the wall. The inserts or enclosures 63 are deposited in the magazines, the lowermost having its forward longitudinal edge resting on the abutment 62 and its opposite rear portion resting on a roller 64. This roller may be made up of sections having a corrugated cylindrical surface in order to frictionally contact the inserts presented thereto one at a time by the action of gravity. The inserts 63 are maintained at an angle of approximately 30 degrees or, in other words, incline downwardly toward the front end of the machine. The rear edges of the inserts are under the influence of springs 65 which are suspended from the upper edge of the wall 61 by means of a clip 66 formed integral with the upper looped end of the springs. Sponge rubber pieces 67 held in place in recesses in the frames 11 and 12 keep all but the bottom insert from moving. The springs 65 maintain the inserts in stack formation. These springs 65 are slidable along the upper edge of the wall 61 of each magazine so as to be adjustable when it is desired to use an accessory 68 for accommodating various inserts as to length, as shown in Fig. 19. Use may also be made of an accessory 69 adapted to be supported from the upper edge of the wall 61 to accommodate inserts of various widths, as shown in Fig. 20.

Figures 8, 10, 11, 12, 13:
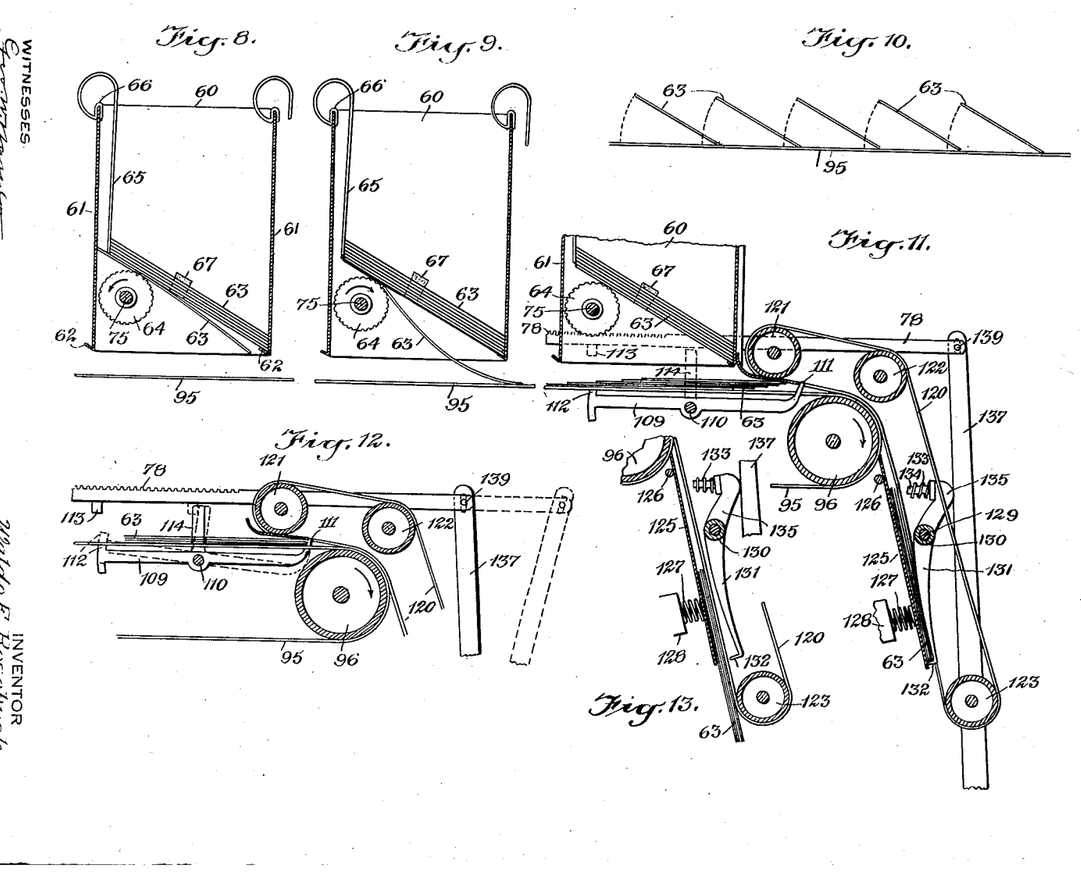
Fig. 8 is a vertical section of a magazine illustrating the manner in which an insert or enclosure item is being withdrawn.
Fig. 10 is a diagrammatic view illustrating the process of collecting various items constituting inserts or enclosures from different sources simultaneously and for simultaneous transference to the collecting or bunching means.
Fig. 11 is a fragmentary vertical section illustrating the manner in which the inserts or enclosures are bunched and subsequently retarded during a sheet folding operation and just prior to the introduction thereof between folds of a sheet.
Fig. 12 is a fragmentary section illustrating the manner in which the inserts or enclosures are bunched.
Fig. 13 is a view illustrating the release of the bunch of inserts for introduction between folds of a sheet being folded.

In order to discharge the inserts 63 downwardly and forwardly at a downward and forward angle, one at a time, there is provided mechanism as follows: Each of the rollers 64 has a shaft 75 whose opposite ends are received in bearings embodied by the frames 11 and 12. A sleeve 76 is arranged on the shaft 75 adjacent the right-hand frame 12 at the outside thereof. A gear 77 is loosely mounted on the sleeve 76. The gear 77 of each shaft 75 meshes with a rack 78 resting on lugs 79 projecting laterally from the frame 12. The forward end of the rack 78 is slidably received in a bracket bearing 80 secured to the frame 12. The lugs 79 and bearing 80 serve as a guide for the rack 78. A connecting rod 81 is supported for reciprocation adjacent the rack by screws 82 carried by the lugs 79. The screws 82 project through longitudinal slots 83 respectively in the rod 81. These screws 82 not only limit the movement of the rod 81 in opposite directions but also hold the rod in place in proximity to the rack 78. The forward end of the rod 81 has a lug 84 having a stub 85 which is slidably received in a bore in the bearing 80. A compression spring 86 surrounds the stub 85 and has one end in engagement with the lug 84 and its opposite end in engagement with the bearing 80. This spring 86 serves to cause the return movement of the rod 81. The forward movement of the rod 81 in response to a similar movement of the rack 78 is caused by virtue of a lug 87 secured to the rack, the lug 87 being engageable with a shoulder 88 formed on the rod 81. The rod 81 carries a spring pressed dog 89 which cooperates with a ratchet wheel 90 pinned fast to each shaft 75. Each gear 77 carries a spring pressed dog 91 which cooperates with a ratchet wheel 92 pinned fast to the related shaft 75. When the rack 78 slides forwardly the lug 87 will encounter the shoulder 88 causing the rod 81 to move forwardly. This will cause the dog 89 to actuate the wheel 90, and as a result the shaft 75 of each magazine 60 will be rotated in a clockwise direction viewing the same from the right side of the machine. This will cause a corresponding clockwise rotation of each of the rollers 64, and as a consequence one insert in each magazine will be moved rearwardly thereby disengaging its forward edge from the abutment 62 as shown in Fig. 8. The roller 64 as viewed in Fig. 8 is from the left side and is therefore rotating in a counter-clockwise direction. During this operation the dog 91 will idly ratchet over the wheel 92. Upon the return movement of the rack 78 each gear 77 will be rotated in a counter-clockwise direction as viewed from the right side of the machine, and as a consequence the dog 90 will impart rotary movement to the wheel 92 which in turn imparts a similar movement to the shaft 75 and therefore to the roller 64. This will cause the insert in each magazine previously disengaged from its abutment 62 to be discharged or precipitated at an angle forwardly and downwardly as shown in Fig. 9. The spring 86 causes the return movement of the rod 81. A certain interval of time elapses between the clockwise and counter-clockwise rotation of each of the rollers 64 in order that the inserts will be discharged simultaneously in timed accord with the sheet folding mechanism. The inserts 63 in each magazine are moved downwardly by gravity, and if desired a follower weight may be used to cause the downward movement of the inserts. The springs 65 allow the pile of inserts to yield slightly in a rearward direction and prevents the inserts from buckling while being disengaged from the abutment 62. The opposite rotation of the rubber rollers 64 for the intended purpose is accomplished in a practical manner by the employment of the ratchets described. However, these ratchets may be omitted and each gear 77 may be made fast on its shaft 75 so as to be rotated by the rack 78 for the purpose of discharging the inserts.

As indicated in Figs. 8, 9 and 10, and particularly Fig. 10, the inserts are discharged or precipitated simultaneously onto an endless traveling support which consists of five endless belts or bands 95 of suitable material to provide the necessary friction. The belts encircle rolls 96 and 97 mounted at the front and rear ends respectively of the machine between the frames 11 and 12. The shaft 98 of the roll 97 is journaled in slidable bearings 99 carried by the frames 11 and 12. Each bearing 99 is adjustable by a set screw 100 carried by the frame. These screws 100 serve for placing the belts 95 under the proper tension. The shaft 101 of the roll 96 has a beveled gear 102 secured thereto adjacent the frame 12. The gear 102 meshes with a similar gear 103 secured to the upper end of a shaft 104 supported for rotation in bearings 105 and 106 respectively on the frame 12. The lower end of the shaft has a beveled gear 107 secured thereto which meshes with a similar gear 108 fast on the stub shaft 22 projecting through the frame 12. It will therefore be understood that the belts 95 are driven by the connections described from the roller 19 which in turn is driven by the gear 26 of the main roller 13. It will be obvious that one insert at a time is discharged from each of the magazines 60 in each revolution of the main roller 13.

In order to gather or collect the inserts which are delivered to the belts 95 in a bunch, there is provided a rocker 109 whose fulcrum 110 is in the form of a rod having its opposite ends supported in bearings embodied by the frames 11 and 12. The rocker 109 has abutments 111 and 112 on the front and rear ends thereof respectively. The rocker operates in the intervals between the belts 95. The rocker 109 is so balanced that in a normal position the abutments 111 will project upwardly beyond the upper surfaces of the belts. The inserts which are being advanced by the belts 95 encounter the abutments 111 and are thus collected or gathered in a bunch as illustrated in Figs. 11 and 12. It will be apparent from Fig. 10 that the inserts are delivered to the belts in such manner that the rear end of all but the last insert will overlap the leading edge of the following insert while at rest on the belts. The rack 78 has a stud 113 which encounters an upstanding member 114 on the rocker shaft 110, thereby actuating the rocker in order to allow the bunch of inserts to be advanced for introduction between folds of one of the sheets being folded by the folding mechanism. A tie rod 115 between the frames 11 and 12 limits the downward movement of the rocker 109 by the stud 113.

The bunch of inserts are transferred from the belts 95 by five belts or bands 120 which encircle rolls 121, 122 and 123, respectively, mounted for rotation between the frames 11 and 12, the shaft 124 of each roll being journaled in bearings embodied by the frames. The arrangement of the rolls 121, 122 and 123 is such that the belts 120 are bent at a right angle with portions extending above the roll 96 and portions extending downwardly and forwardly below the roll 96. The rearward lead of each belt 120 cooperates with one of the belts 95 whereby to cause each belt 120 to move in response to the related belt 95. The bunch of inserts is carried forwardly and then downwardly by the belts 95 and 120 until they are momentarily arrested by a means presently to be described. A plate 125 is supported for swinging movement on a rod 126 near the upper end thereof and attached thereto. This rod 126 is supported by the frames 11 and 12. The lower end of the plate 125 is under the influence of a compression spring 127 at each side of the machine. Each spring 127 is arranged between the plate 125 and a lug 128 on the related frame. A rod 129 has its opposite ends supported by the frames 11 and 12. A tube 130 surrounds the rod and carries four depending fingers 131 each of which has a laterally bent end 132. These fingers 131 move in the intervals between the belts 120. In one position, as shown in Fig. 11, the ends 132 of the fingers will be disposed to engage the lower edges of the bunch of inserts and in cooperation with the plate 125 will momentarily arrest the downward movement of the bunch. This movement of the fingers 131 to the position mentioned is accomplished by a spring 133 encircling a stud 134 on a crank 135 carried by the rod 129. The spring 133 has its opposite ends in engagement respectively with the bearing 105 and a portion of the crank 135. The crank 135 has a lateral projection 136 which is engaged by a lever 137 fulcrumed on the frame 12. This lever 137 is actuated by a cam 138 on the shaft 14. The upper end of the lever 137 has a pin and slot connection 139 with the forward end of the rack 78. The lever 137 not only reciprocates the rack 78, but also actuates the fingers 131 in each revolution of the roller 13. When the lever 137 engages the projection 136 the fingers 131 will be swung forwardly as shown in Fig. 13, and as a result the bunch of inserts will move downwardly guided by the plate 125 and under the influence of the belts 120. The spring 133 serves to cause return movement of the lever 137 and also to maintain its lower end in contact with the cam 138. If desired an extra spring may be employed to cause return movement of the lever 137. It will therefore be understood that the lever 137 not only controls the discharge of the inserts from the magazines 60, but also controls the release of the bunch of inserts after retardation of movement thereof by the fingers 131. The bunch of inserts is held momentarily while the second fold is being given to the sheet by the folding mechanism. The bunch of inserts is released so as to drop or be inserted between the first and third folds of the sheet at a predetermined time in the sheet folding operation. A guide 144 on the foremost magazine 60 guides the bunch of inserts between the belts 95 and 120. A tie rod 145 extending between the frames 11 and 12 supports a guard 146 which prevents the bunch of inserts from being acted on by the roller 19 and serves to guide the same to a position in which they may be introduced between the folds of the sheet being folded.

Figures 7, 22:
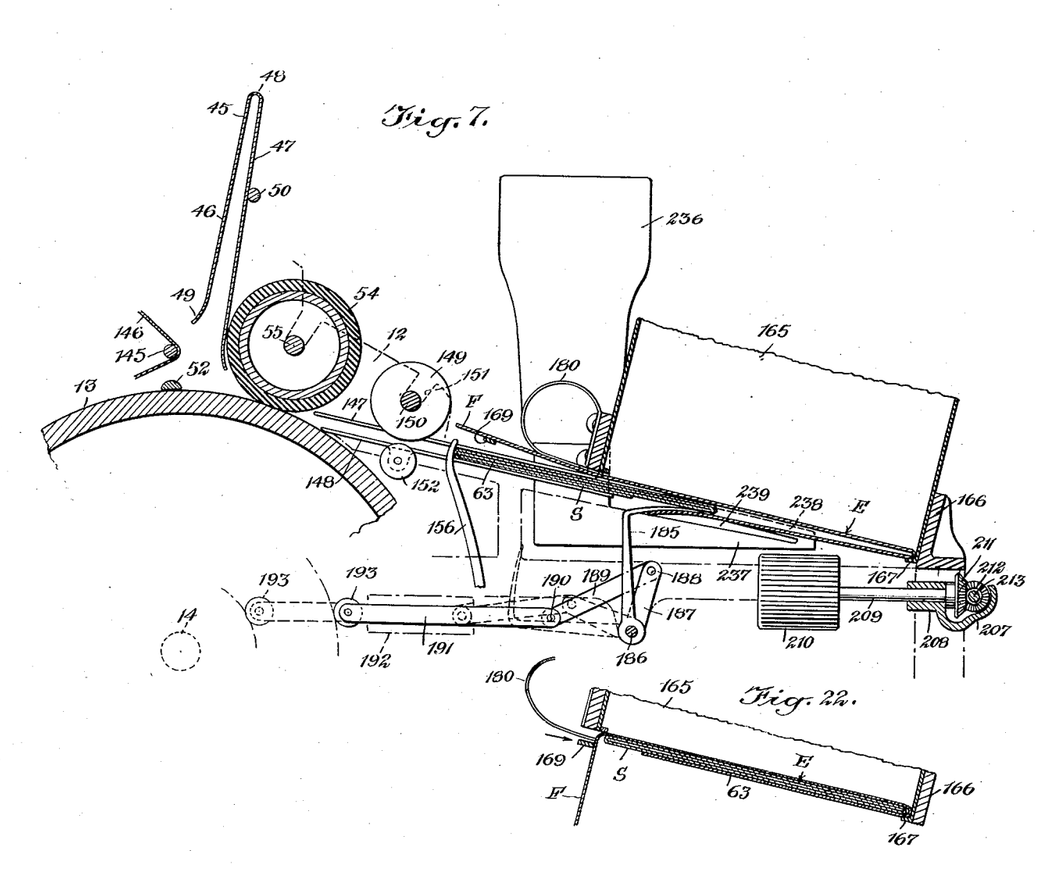
Fig. 7 is an enlarged fragmentary vertical section, illustrating an envelope stuffing operation.
Fig. 22 is a detail section showing the manner in which the flap of an envelope is thrown to its closed position after the envelope has been stuffed.

The inserts which are transferred from the magazines 60 between the folds of each sheet are advanced together with the sheet by the main roller 13 and the auxiliary roller 54 between an upper plate 147 and a lower plate 148 supported by the frames 11 and 12 in spaced relation to each other and inclined slightly forwardly and downwardly as shown most clearly in Fig. 7. A feed roller 149 has a shaft 150 whose opposite ends are received respectively in notches 151 in the frames 11 and 12. This roller 149 coacts with rollers 152 carried by the frames 11 and 12. A shaft 153 is supported by a bearing embodied by the frame 12. The inner end of the shaft 153 has a gear 154 which meshes with the gear 56' on shaft 55, and also meshes with a gear 155 on the shaft 150. In this manner the roller 149 is rotated in a direction similar to that of the roller 54. The rollers 54, 149 and 152 advance the folded sheet together with the inserts carried thereby to a predetermined position from which they are advanced into an empty unsealed envelope by means of two fingers 156 carried by a rod 157 supported at its opposite ends by bearings embodied by the frames 11 and 12. The end of the rod 157 at the left side of the machine has an arm 158 fixed thereto. This arm has a roller 159 on its outer end which is acted upon by cam 33. The provision and arrangement is such that the fingers 156 will be moved forwardly to advance the folded sheet and inserts carried thereby and then be moved rearwardly in each revolution of the main roller 13. The plates 147 and 148 are cut out to accommodate the fingers 156, as at 160. These plates are also cut out to accommodate the flap of each envelope.

In accordance with the invention use is made of a magazine 165 which is supported by a frame 166 secured transversely of the machine at the front end thereof and secured in position to the frames 11 and 12. The magazine is of rectangular formation, the same being constructed of sheet metal. The magazine is open both at the top and bottom and is adapted to contain a multiplicity of empty and unsealed envelopes E in stack formation. The lower edge of the front wall of the magazine is bent inwardly to form an abutment 167. The magazine 165 is slightly tilted so that the envelopes will move downwardly and be presented one at a time in a predetermined position in which the envelope will incline forwardly and downwardly with the back of the envelope facing downwardly. Therefore the flap F of each envelope will be facing downwardly with its gummed edge forward and spaced from the back of the envelope.

In order to throw back the flap F of each envelope and to subsequently return it to its original position, or, in other words, in order to move the flap of each envelope to open and closed positions, use is made of the following mechanism: A bracket 168 is secured to the frame 11. A flexible flap throw member 169 has one end pivotally connected with the outer end of the bracket as at 170. The member 169 is tapered almost to a point and is bowed or curved at its free end so as to readily engage under the envelope flap. The throw member 169 is swung back and forth by means of a bell crank lever 171 whose fulcrum 172 in the form of a cross rod is supported by the frames 11 and 12. The member 169 rides up and down on a valley cam 164 on the bracket 168. The upper end 173 of the lever 171 extends through a slot 174 in the bracket 168 and also extends in a longitudinal slot 175 in the throw member 169. The other end 176 of the lever 171 has a roller 177 in contact with a cam 178 fixed to the shaft 14. A contractile spring 179 has one end thereof connected with the lever 171 and its opposite end connected with the arm 158. The spring 179 serves to cause return movement of the lever 171 and the arm 158 so as to be responsive to the contour of the respective cams 178 and 33. It will be obvious that the throw member 169 will swing or pivot back and forth once in each revolution of the shaft 14. Consequently the throw member 169 functions to move the flap of each envelope from a normally closed position to an open position and to subsequently return the flap to its original or closed position. The stroke of the throw member 169 is such that it will clear the envelope flap while the latter is in open position. The envelope flap in being swung to the open position is pressed upwardly by the throw member 169 against substantially semicircular springs 180 carried by the magazine frame 166. The lower portions of the springs 180 yield or flex upwardly in response to the pressure exerted by the throw member 169. After the throw member 169 has cleared the envelope flap, the springs 180 have reacted to swing the flap slightly downward, consequently upon the return movement of the throw member 169 it will engage the envelope flap on the top and so be enabled to return the flap to its closed position. It is to be understood that the folded sheet and inserts carried thereby will be stuffed or introduced into each envelope before its flap is returned to the closed position.

In accordance with another feature of the invention use is made of a plurality of fingers 185, there being six in number in the present instance. These fingers are carried by a rod 186 whose opposite ends are journaled in bearings embodied by the frames 11 and 12. A crank 187 on the rod 186 is pivotally connected as at 188 with a link 189, and said link is pivotally connected as at 190 with one end of a slide 191 which is slidable back and forth in a guide 192 carried by the frame 12. The slide has a roller 193 which is acted on by a cam 194 fixed to the shaft 14. A contractile spring 195 has one end connected with the pivot 188 and its opposite end is connected with the guide 192. This spring serves to maintain the cooperative relation of the slide 191 with the cam 194 and to retract the fingers 185. The fingers 185 constitute means to engage the pocket entrance edge of each envelope back to flex it slightly downward while the flap of the envelope is in open position, so that the folded sheet together with the inserts carried thereby may be stuffed or inserted into the envelope by the fingers 156, the fingers 185 while acting as aforesaid also serve as guiding means to facilitate the introduction of said matter into the envelope.

In order to exert proper pressure in conjunction with the rollers 13 and 152 for the purpose of feeding the folded sheets, each of the arbors 55 of the roller 54 and each of the ends of the shaft 150 of the roller 149 has connected therewith a tension device 200. These devices are connected with the frames 11 and 12 as the case may be.

Figure 1:
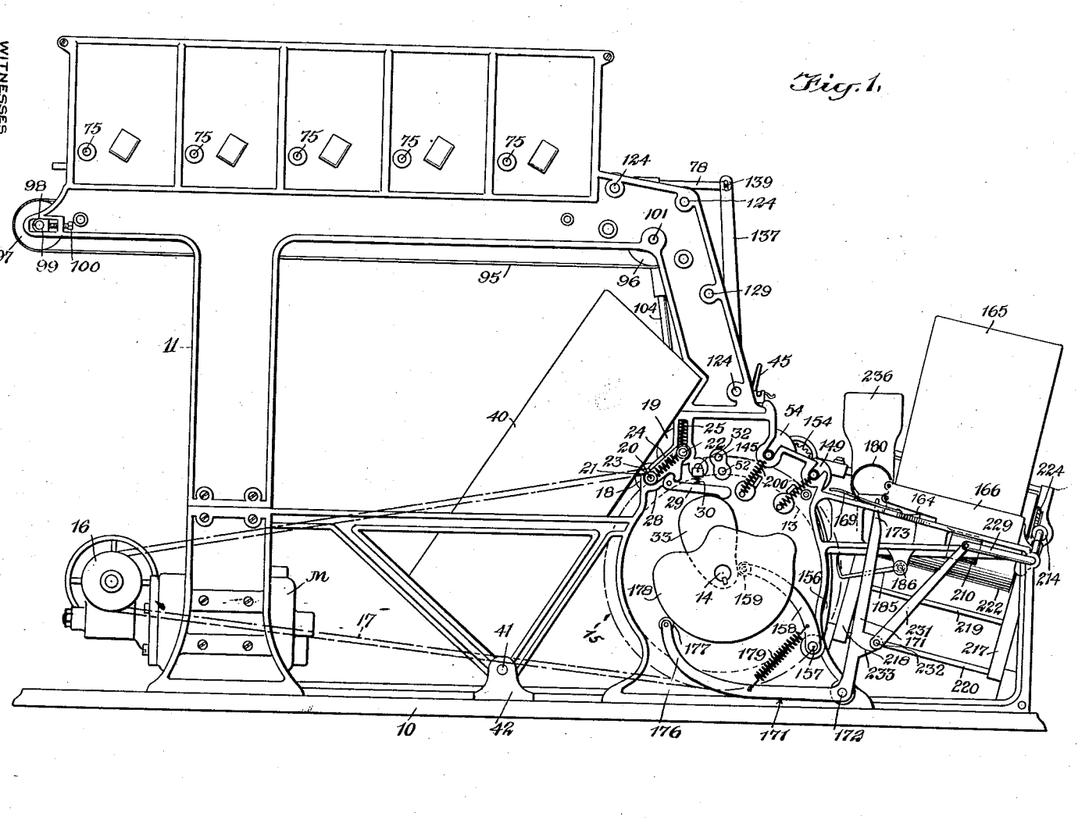
Fig. 1 is a view of the left side of a machine embodying the features of the invention.
Figures 2, 21:
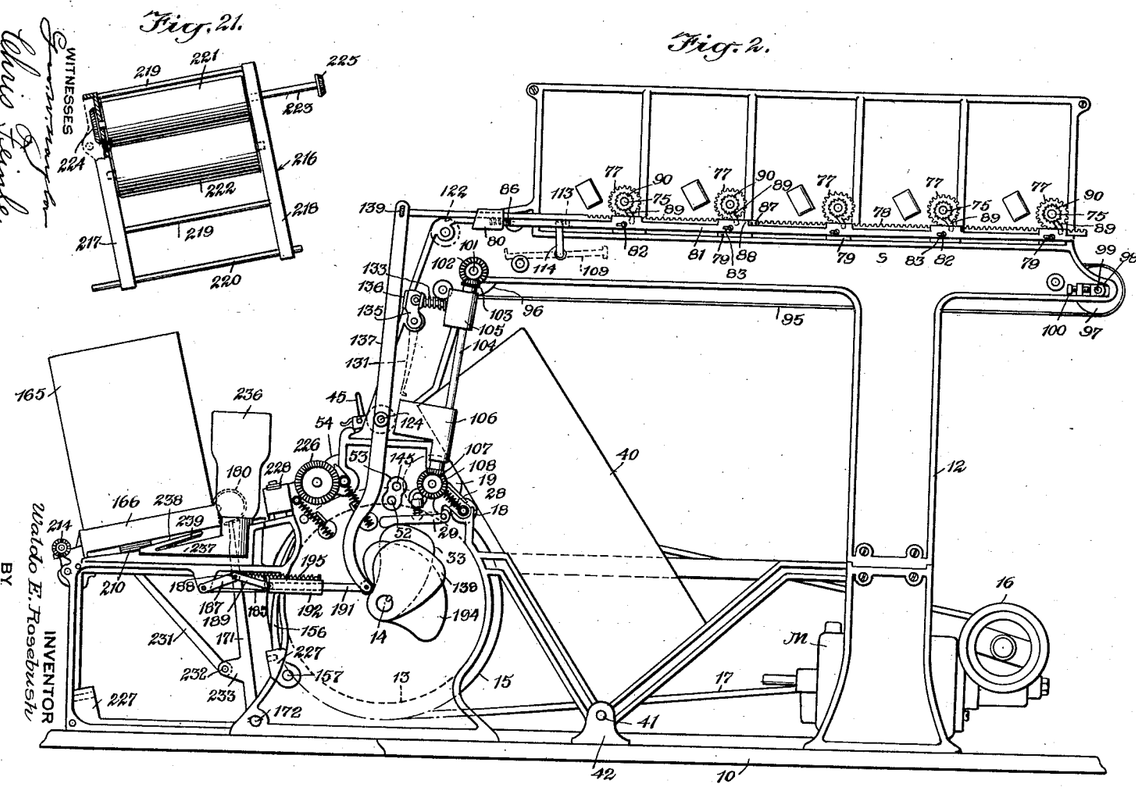
Fig. 2 is a view of the right side of the machine.
Fig. 21 is an end view of the envelope sealer detached.
Figures 14, 18:
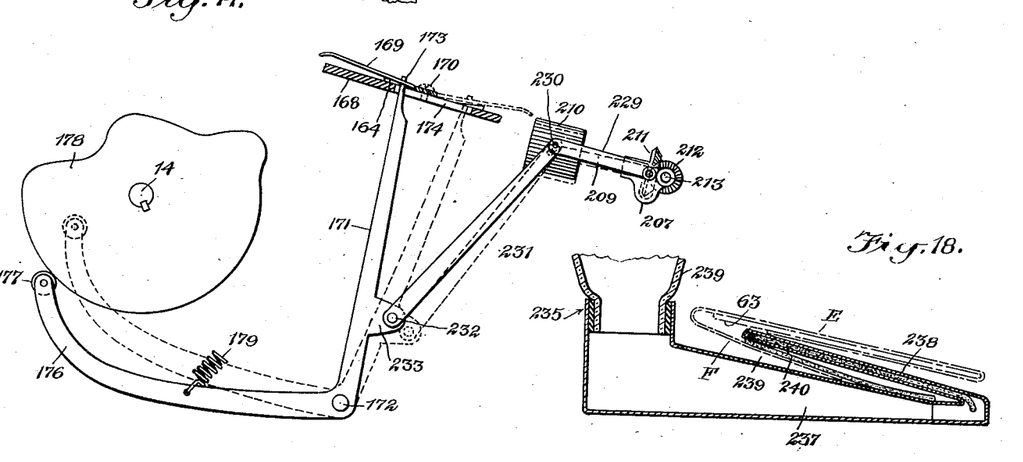
Fig. 14 is a side view and part section illustrating the envelope flap throw member and envelope advancing rotor together with operating means therefor.
Fig. 18 is a sectional view of the moistener, a portion of the font being broken away.
Figures 15, 17:
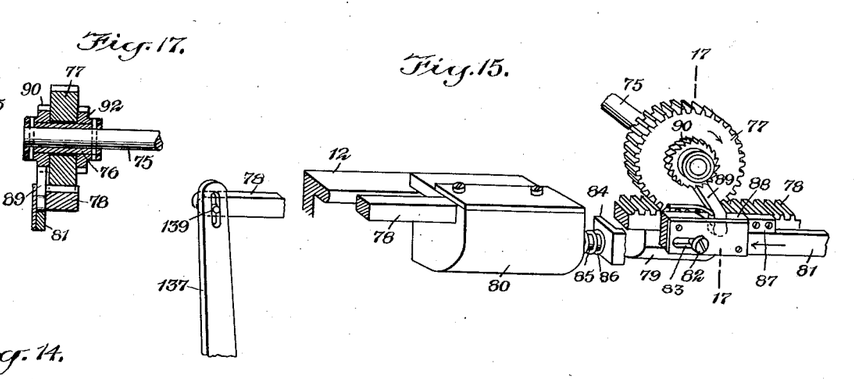
Fig. 15 is a view in perspective and part section illustrating an assembly of parts of the insert delivery mechanism.
Fig. 17 is a section taken on the line 17—17 of Fig. 15.
Figure 16:
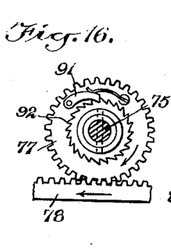
Fig. 16 is an inside view of one of the gears and ratchet of the aforesaid mechanism.

In order to feed and seal the stuffed envelopes there is provided the following mechanism: Shafts 205 and 206 respectively are connected in axial alinement by a coupling 207 which is in the nature of a housing, the outer ends of the shafts 205 and 206 are respectively supported by bearings embodied by the frames 11 and 12. The coupling 207 embodies a bearing 208 which supports a shaft 209 having a rubber feed roller 210 on its inner end and a beveled gear 211 on its opposite end. The gear 211 meshes with a beveled gear 212 and one end of a shaft 213 whose opposite end has secured thereto a beveled gear 214. The shaft 213 is supported for rotation and held against axial movement by a housing 215 which embodies suitable bearings for the shaft. The housing 215 is formed integral with the frame 12. Use is made of an attachment 216 shown in Fig. 21 detached from the machine. The attachment includes arms 217 and 218 respectively which are connected together by cross rods 219 and 220. A pair of pressure rollers 221 and 222 respectively are mounted for rotation between the arms 217 and 218. The roller 221 has a shaft 223 whose opposite ends extend through and beyond the arms and the shaft is thus supported for rotation. One end of the shaft 223 adjacent the arm 217 has a beveled gear 224 which meshes with the gear 214 when the attachment 216 is in position. The other end of the shaft 223 has a beveled gear 225 which meshes with a beveled gear 226 fast on the shaft 153 when the attachment 216 is in position. The attachment is detachably held in place by the engagement of the opposite ends of the rod 220 respectively in bearings 227 on the frame 12, and by reason of the engagement of the shaft 223 in a bearing 228 on the frame 12. The bearing 228 is of such construction that the shaft 223 may be readily engaged in the bearing 228 and be disengaged therefrom so that the attachment 216 may be put into and out of use as may be desired. The coupling 207 has an arm 229 which is pivotally connected as at 230 with one end of a link 231 whose opposite end is pivotally connected as at 232 with a lug 233 on the lever 171, as shown most clearly in Fig. 14. This provision causes the movement of the roller 210 into and out of active position in response to the operation of the lever 171. In the up position, the roller 210 will advance each envelope presented thereto to the rollers 221 and 222. The roller 210 is brought to the down position and remains inactive while each envelope is being stuffed or having a folded sheet inserted therein. By effecting the movement of the roller 210 into and out of active position in response to the operation of the lever 171, it will function in timed accord with the stuffing mechanism of the machine.

In order to condition or moisten the film of adhesive substance on the inside of the flap of each envelope as it is advanced by the roller 210, use is made of a moistener 235 of suitable construction. The moistener is arranged on the frame 12 between the roller 221 and the envelope magazine, and is locked in position by the attachment 216. This moistener includes a font 236 and a liquid applicator consisting of portions 237 and 238 which bear a converging relation to each other to provide a V-shape notch 239 to accommodate the flap of each envelope. The portion 238 of the applicator contains a wick 240 of absorbent material which extends into the portion 237 and also extends into the notch 239. The wick becomes moist by capillary attraction and applies liquid to the adhesive substance on the inside of each envelope flap as the envelope is fed or advanced to the sealing rollers 221 and 222. These rollers exert pressure on opposite sides of the envelope and thus effectually press the flap in sealing engagement with the back of the envelope.

The operation of the machine, briefly stated, is as follows: The sheets containing correspondence are withdrawn by the rollers 18 and 19 one at a time from the magazine 40 and each sheet is given its first fold by these rollers. The sheet is then fed by the rollers 13 and 19 to the fold pocket 45 to be given its second fold. During this operation inserts are delivered from the magazine 60 to the belts 95. The rocker 109 collects or gathers the inserts in a bunch after which the bunch is transferred by the cooperation of the belts 95 and the belts 120. The bunch of inserts are held momentarily by the holding fingers 131 as the sheet is being given its second fold. Just prior to the completion of the second fold the bunch of inserts are dropped between the first and second folds of the sheet and together with the folded sheet are advanced by the rollers 13 and 54 and also the rollers 149 and 152 to a predetermined point. At this point the folded sheet together with inserts contained therein are advanced by the fingers 156 into the empty envelope whose flap is thrown to open position by the throw member 169 and while the entrance edge of the envelope pocket is held down by the fingers 185. The envelope flap is then thrown to closed position after which it is advanced by the roller 210 to have the flap thereof moistened by the moistener 235 and finally be subjected to the pressure of the rollers 221 and 222 to press the flap of the envelope in adhesive engagement with the back of the envelope to seal the same.

Figures 23, 24, 25, 26:
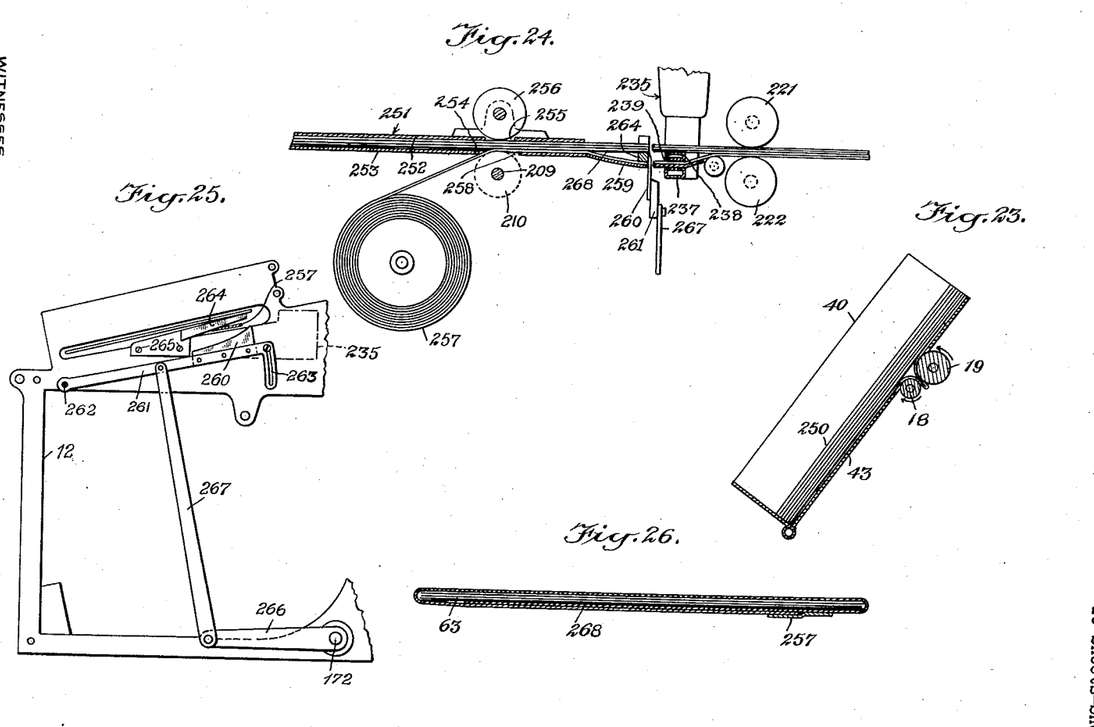
Fig. 23 is a sectional view of the sheet magazine and folding rolls.
Fig. 24 is a fragmentary longitudinal section of an attachment for applying a closing strip to mailing folders.
Fig. 25 is a transverse section showing the strip cutter of the attachment appearing in Fig. 24.
Fig. 26 is a transverse section of a mailing folder closed in accordance with the invention.

In order to produce folders from sheet material of a size 8½ inches wide by 11 inches long, there is provided an auxiliary device to be used in conjunction with the machine. This device is illustrated in Figs. 24 and 25. The sheet material from which the folders are produced will be relatively stout paper or light cardboard and is designated 250 in the drawings. The sheets of material 250 may be placed in the magazine 40 hereinbefore described. Each sheet will be presented flatwise and will be withdrawn from the magazine 40 through the opening 44 by the action of the rollers 18 and 19. These rollers will crease and fold each sheet to give it is first fold. The second fold will be produced in the manner and by the folding mechanism hereinabove described. Inserts or enclosures will be introduced between folds of each folder in the manner and by the means hereinbefore described. The magazine 165 will be removed from the frame 166. The guide 251 consists of plates 252 and 253 respectively in spaced relation to each other and joined along adjacent longitudinal edges. The guide 251 is secured in place to the frame 166. The plate 253 has an opening 254 therein to accommodate the feed roller 210. The plate 252 has an opening 255 to accommodate a feed roller 256 mounted on the plate 252. A roll of tape 257 is mounted below the plate 253 and said tape passes upwardly through the opening 254. The tape 257 moves in a downwardly curved guide 259 integral with the plate 253. This guide 259 is of two parts to provide space to accommodate a knife 260 one end of which is pivoted on the frame 12, as at 262, and its other end being guided by a pin and slot connection 263, the pin thereof being carried by said frame. The knife 260 cooperates with a cutter bar 264 fixedly secured as at 265 to the frame 12. The knife 260 is operated by means of an arm 266 on the fulcrum 172 of the lever 171, and a link 267 connecting the arm 266 with the arm 261. The tape 257 has adhesive substance on one side thereof so as to be applicable to the folds of the enveloping folder produced. Such folder is shown in Fig. 26 and is designated 268. These folders are advanced by the fingers 156 into the guide 259. The folder is then advanced by the roller 210 for the application thereto of the tape 257. The roller 210 at the same time also advances the tape 257. This tape is moistened by the moistener 235 and is then subjected to the pressure of the rollers 222 to effectually seal the folder. The knife 260 is operated in timed accord with the movement of the folder and serves to cut the tape 257 the required length equal to that of the folder 268.

It is to be understood that the invention is not restricted to the embodiment illustrated in the drawings but that details of construction may be modified and rearranged in accordance with the invention as expressed in the claims hereunto appended.

I claim:

1. In a machine of the class described, a movable support, a plurality of devices above the support for depositing sheet material on said support, means cooperating with the support to temporarily retard the movement of the material with respect to the support in order to bunch the same, a plate member at an angle to said support against which said bunch may be guided flatwise, an endless movable belt having one of its leads disposed flatwise with respect to said plate member to cooperate with the latter to guide and also impart movement to said bunch as the bunch leaves the support, and means to overcome the cooperative action of the plate member and lead and to thereby momentarily stop the movement of said bunch.

2. In a machine of the class described, a swingingly mounted spring pressed plate member serving as a guide for suitable material, an endless movable belt having one of its leads disposed flatwise with respect to said member to cooperate with the latter to guide and impart movement to the material, and means to overcome the cooperative action of the plate member and lead and to thereby momentarily stop the movement of the material.

3. In a machine of the class described, a swingingly mounted spring pressed plate member serving as a guide for suitable material, an endless movable belt having one of its leads disposed flatwise with respect to said member to cooperate with the latter to guide and impart movement to the material, a rock shaft, fingers on said shaft and movable therewith into and out of stopping position with respect to said member to overcome the cooperative action of the plate member and lead and to thereby momentarily stop the movement of the material.

4. In a machine of the class described, the combination of sheet folding means, a plurality of magazines each of which is adapted to contain inserts, a traveling support positioned to receive inserts discharged from said magazines, means to simultaneously discharge inserts from said magazines onto said support in overlapping relation, means cooperating with said support to gather the inserts thereon into a bunch, and means cooperating with said support to deliver the bunch of inserts between the folds of a sheet while being folded by said sheet folding means.

5. In a machine of the class described, the combination of sheet folding means, a plurality of magazines each of which is adapted to contain inserts, a traveling support positioned to receive inserts discharged from said magazines, means to simultaneously discharge inserts from said magazines onto said support in overlapping relation, means cooperating with said support to gather the inserts thereon into a bunch, means cooperating with said support to deliver the bunch of inserts between the folds of a sheet while being folded by said sheet folding means, and power means to operate the folding means, support, gathering means and delivering means in timed accord.

6. In a machine of the class described, the combination of sheet folding means, a plurality of magazines each of which is adapted to contain inserts, a traveling support positioned to receive inserts discharged from said magazines, means to simultaneously discharge inserts from said magazines onto said support in overlapping relation, means cooperating with said support to gather the inserts thereon into a bunch, means cooperating with said support to deliver the bunch of inserts between the folds of a sheet while being folded by said sheet folding means, and means cooperating with the folding means to advance said folded sheet and the inserts.

7. In a machine of the class described, the combination of a plurality of magazines each of which is adapted to contain inserts, a traveling support positioned to receive inserts discharged from said magazines, means to simultaneously discharge inserts from said magazines onto said support in overlapping relation, and means cooperating with said support to gather the inserts thereon into a bunch and to release the bunch for movement by the support.

8. In a machine of the class described, a movable support, a plurality of devices above the support for depositing sheet material on said support, means cooperating with the support to temporarily retard the movement of the material with respect to the support in order to bunch the same, a swingingly mounted spring pressed plate member, and an endless movable belt having one of its leads disposed flatwise with respect to said plate member to cooperate with the latter to guide and impart movement of said bunch as it is advanced by said support.

9. In a machine of the class described, a movable support, a plurality of devices above the support for depositing sheet material on said support, means cooperating with the support to temporarily retard the movement of the material with respect to the support in order to bunch the same, a swingingly mounted spring pressed plate member, an endless movable belt having one of its leads disposed flatwise with respect to said plate member to cooperate with the latter to guide and impart movement of said bunch as it is advanced by said support, and means to overcome the cooperative action of the plate member and belt lead and at the same time momentarily stop the movement of said bunch.

10. In a machine of the class described, a movable support, a plurality of devices above the support for depositing sheet material on said support, a rocker cooperating with the support to temporarily retard the movement of the material with respect to the support in order to bunch the same, means to operate the rocker in timed accord with the operation of said devices, a plate member at an angle to said support against which said bunch may be guided flatwise, an endless movable belt having one of its leads disposed flatwise with respect to said plate member to cooperate with the latter to guide and also impart movement to said bunch as the bunch leaves the support, and means to overcome the cooperative action of the plate member and lead and to thereby momentarily stop the movement of said bunch.

WALDO E. ROSEBUSH.